US008681616B2

(12) United States Patent
Chen et al.

(10) Patent No.: US 8,681,616 B2
(45) Date of Patent: Mar. 25, 2014

(54) SCHEDULING UNDER CONGESTION WITH TRAFFIC LOAD-BASED SCALING

(75) Inventors: Minghua Chen, Coquitlam (CA); Desmond Yan, Vancouver (CA); Blair Mackiewich, Surrey (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 257 days.

(21) Appl. No.: 13/209,319

(22) Filed: Aug. 12, 2011

(65) Prior Publication Data

US 2013/0039178 A1 Feb. 14, 2013

(51) Int. Cl.
*H04L 12/26* (2006.01)
(52) U.S. Cl.
USPC ........................ 370/230.1; 370/235
(58) Field of Classification Search
USPC ............................. 370/230.1, 235
See application file for complete search history.

(56) References Cited

U.S. PATENT DOCUMENTS

| | | | |
|---|---|---|---|
| 2002/0136200 A1* | 9/2002 | St. John | 370/352 |
| 2003/0202467 A1 | 10/2003 | Bruckman et al. | |
| 2005/0271084 A1 | 12/2005 | Bruckman et al. | |
| 2007/0153697 A1* | 7/2007 | Kwan et al. | 370/235 |
| 2007/0253438 A1 | 11/2007 | Curry et al. | |
| 2008/0176577 A1 | 7/2008 | Bourlas et al. | |
| 2008/0219268 A1 | 9/2008 | Dennison | |
| 2011/0149977 A1* | 6/2011 | Thomas et al. | 370/395.41 |
| 2012/0008636 A1* | 1/2012 | Lee | 370/412 |

OTHER PUBLICATIONS

Sila Kurugol, "A Dynamic DRR Scheduling Algorithm for Flow Level QOS Assurances for Elastic Traffic," Sep. 2006, 98 pages, downloaded from http://www.thesis.bilkent.edu.tr/0003175.pdf.
Viet L. Do et al., "An Efficient Frame-Based Scheduling Algorithm: Credit Round Robin," Jun. 24, 2003, 8 pages, High Performance Switching and Routing Workshop on Jun. 24-27, 2003, Piscataway, NJ, USA, IEEE.
Doo-Sung Back et al., "A Hierarchical Deficit Round-Robin Scheduling Algorithm for a High Level of Fair Service," 2007 International Symposium on Information Technology Convergence, IEEE.
U.S. Appl. No. 13/237,745, filed Sep. 20, 2011, Chen et al.
http://metroethernetforum.org/PDF_Documents/Bandwidth-Profiles-for-Ethernet-Services.pdf, Retrieved Jun. 6, 2011.
Scheduling Buffer Management, http://www.cs.tau.ac.il/-mansour/networking-2005/Icc4.ppt., retrieved on Apr. 13, 2011.
Notice of Allowance, U.S. Appl. No. 13/237,745, dated May 31, 2013, 13 pages.

(Continued)

*Primary Examiner* — Albert T Chou
(74) *Attorney, Agent, or Firm* — Blakely Sokoloff Taylor Zafman LLP

(57) ABSTRACT

Apparatus and techniques for scheduling packets to reduce congestion in a packet data network are described. In one embodiment of the invention, packets are received through each of a plurality of channels and are stored in a respective queue for each channel. The status of each queue is monitored as empty or not empty. When an empty queue becomes not empty, then bandwidth allocation value is added for the respective channel to a port load value. When a not empty queue becomes empty, then the bandwidth allocation for the respective channel is subtracted from the port load value. The traffic rate through the port is then scaled based upon the port load value.

17 Claims, 6 Drawing Sheets

(56) References Cited

OTHER PUBLICATIONS

"Technical Specification MEF 6.1 Ethernet Services Definitions—Phase 2", Apr. 30, 2008; pp. 1-59; XP55037965; Retrieved from the Internet: URL:http://metroethernetforum.org/PDF_Documents/technical-specifications/MEF6-1.Pdf.

Xiaoming, He, et al., "Transporting Metro Ethernet Services over Metropolitan Area Networks", *Sensor Networks, Ubiquitous, and Trustworthy Computing, 2006, IEEE International Conference on Taichung, Taiwan; Jun. 2006; vol. 2, pp. 178-185.*

\* cited by examiner

SCHEDULING UNDER CONGESTION WITH TRAFFIC LOAD-BASED SCALING

FIELD

Embodiments of the invention relate to the field of scheduling packets in computer networks; and more specifically, to reducing congestion using a measure of channel traffic load.

BACKGROUND

When a packet communication network becomes congested, ports that supply packets through the communications infrastructure can end up dropping one or more packets in a stream. This can result in errors at the receive end of a connection. In some networks, however, when a single packet is dropped an entire block of packets may be resent in order to recover from the error. Resending all of the packets in a block in order to recover a single or a few dropped packets adds more traffic and can make the congestion worse.

At the same time, packet traffic is often bursty in that for short time packets will arrive at a port very quickly, then no packets or only a few packets will arrive. In many cases, this busty pattern is caused by typical user behavior. An Internet browser, for example, might select to view a web page causing a server to send all of the packets necessary to transfer the web page. The user then views the web page after it is received and makes no requests for a time.

To take advantage of this typical traffic pattern, traffic is throttled at some ports so that during busy periods traffic is buffered and packets are sent at a slower rate than is requested. The extra packets continue to be sent during a normally quiet period until all of the buffers are emptied. This type of throttling requires choices to be made between packets that are urgent or higher priority and those that are less urgent or lower priority. It also requires a scheduler to reduce the rate at which packets are applied to the port in order to prevent any from being dropped. There are many different approaches to scheduling which try to determine which packets should be sent first.

A Round-Robin (RR) and Weighted-Round-Robin (WRR) scheduler picks packets based on a weight assigned to a channel. Bandwidth share is maintained according to weights. Decisions are made on the basis of packets.

RR scheduling is used to maintain the relative shares among channels in both non-congested and congested conditions. However, it does not assign a fixed-rate to a channel. This allows any subscriber to use as much bandwidth as is available. Weights can be assigned to channels to give channels different levels of relative shares.

A Deficit-Round-Robin (DRR) scheduler runs in rounds based on a fixed time interval. A channel is added by a certain number of credits or counts in each round. The current number of credits of a channel is the same as the number of bytes or bits the channel is eligible to send. The scheduler picks packets from channels that have enough credits to cover the size of the packet. Traffic is measured in units of bits or bytes rather than in packets, thus DRR maintains fairness bandwidth among channels on the basis of bits-per-second. In contrast, RR and WRR maintain fairness among channels on the basis of the number-of-packets.

With credit-based systems, channels are refilled with credits as time goes by. This changes the round-robin behavior from packet-based scheduling to bandwidth-based scheduling. This also gives the ability for service providers to cap subscriber bandwidths to fixed amounts.

Generalized Process Sharing (GPS), Weighted-Fair-Queuing (WFQ), Worst-Case-Fair-Weighted-Fair-Queuing (WF2Q) are all based on DRR, and are bit-based algorithms.

Reservation-based GCRA (Generic Cell Rate Algorithm) is an ATM (Asynchronous Transfer Mode) formula provided by the ATM Forum Traffic Management version 4.0. This has been approximated using a scoreboard to perform scheduling. Since, in ATM, all the packets are fixed-size cells, a credit unit on the scoreboard can be degenerated to a one-bit number. The scoreboard uses one bit to keep a schedule of sending cells for a channel. With this hardware scoreboard based scheduling, the effect of WRR is achieved.

The problem with the scoreboard is that multiple channels can compete for a single timeslot. The GCRA describes the rate of single channel based on shaping/policing parameters. It therefore seeks to maintain a maximum-minimum fairness, that is, to give low-demand channels (e.g. 1.5M channels) an advantage over high-demand channels (e.g. 6M channels) under congestion. As a result, under congestion, the high-paying customers receive the same amount of bandwidth as all other customers. The max-min fairness makes proportional fairness impossible.

SUMMARY

Apparatus and techniques for scheduling packets to reduce congestion in a packet data network are described. In one embodiment of the invention, packets are received through each of a plurality of channels and are stored in a respective queue for each channel. The status of each queue is monitored as empty or not empty. When an empty queue becomes not empty, then bandwidth allocation value is added for the respective channel to a port load value. When a not empty queue becomes empty, then the bandwidth allocation for the respective channel is subtracted from the port load value. The traffic rate through the port is then scaled based upon the port load value.

In another embodiment of the invention, a network element has a plurality of channel interfaces to receive packets and a plurality of packet queues coupled respectively to each channel interface to buffer packets received at the channel interfaces. A port is coupled to the queues to transmit received packets from the queues, and a scaler monitors the status of each queue as empty or not empty, adds a bandwidth allocation for a respective channel to a port load value when an empty queue becomes not empty, subtracts a bandwidth allocation for the respective channel to the port load value when a not empty queue becomes empty, and scales the traffic rate through the port based upon the port load value.

This approach adds very little computation burden to the system by not computing scaling and load factors every time a packet arrives. Instead it takes advantage of the fact that the traffic in IP-based networks is mostly bursty. As a result queues tend to stay empty or non-empty through several packets.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
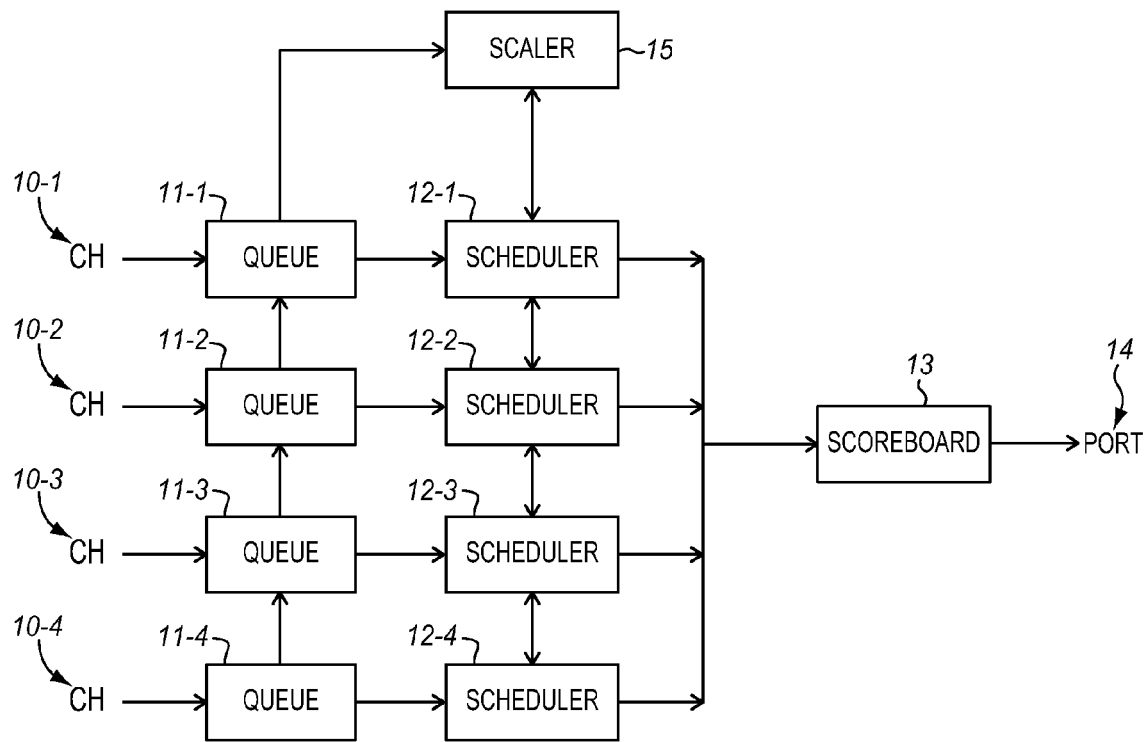
FIG. 1 is a simplified block diagram of a packet scheduler according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Port and Channel: In network service systems, data are transferred in the form of packets. The physical transport carrier is referred to as a port. For example, in an edge router, there can be a 100M Ethernet port to connect to an up-stream router, while another two 10M Ethernet ports can be used to connect to two subscribers. A port can be divided into channels. As an example, the up-stream 100M Ethernet port could be divided into 2 channels, one for each down-stream subscriber. This is a typical case where multiple subscribers share the bandwidth of a port. Port and channel are used herein to indicate the higher and lower levels of traffic processing.

Congestion: In a router, traffic comes in from some Ingress (in-coming) ports and will be routed to other Egress (out-going) ports. When traffic from multiple incoming channels is routed to the same Egress port, the aggregated traffic may exceed the Egress port bandwidth. When that happens, the port is congested. Under congestion some packets are dropped in the router.

Queuing, Scheduling, And Shaping: These are the traffic handling elements in a router. A queue is used to buffer incoming packets and perform logic dropping of packets. In the examples herein, there is one queue per channel for this discussion. A scheduler is used to determine from which channel queue a packet will be sent to the Egress port. When looking at one traffic carrying unit (a channel or a port), the scheduler is also referred to as a shaper, in the sense that it shapes the rough incoming traffic pattern into smooth out-going traffic. By smooth, is meant that the traffic conforms to a certain pre-defined set of service level agreements. For example, a channel shaper on a 1.5M subscriber channel will shape the traffic into a smooth 1.5M packet stream. Or a port shaper on a 100M Ethernet port will shape the aggregated out-going traffic from multiple channels to the port rate. Queuing, scheduling, and shaping are used herein to refer generally to techniques used to handle traffic.

Fairness: Fairness is a goal to measure how a scheduler performs to give each individual channel a fair share of the bandwidth. For channels with different bandwidth allocations fair refers to a proportional share of bandwidth in accordance to the assigned channel bandwidth configuration.

According to embodiments of the present invention a simple instant traffic load algorithm applies a load result to the scheduler to achieve proportional fairness, using very little hardware and software resources. The instant configured traffic load level of a port can be computed with minimum computation cost.

According to embodiments of the invention the traffic load level is applied to the scheduling process to achieve fairness. At the time the scheduler calculates credits or ATM cell-intervals, the load-level is used to scale credits down or scale the cell-interval up when the port is congested. This avoids a disproportional degeneration of channels of different assigned bandwidths.

By dynamically scaling back a channel by the same amount that the traffic load exceeds the port bandwidth, the scheduler effectively avoids traffic congestion. This prevents the scheduler from trying to schedule more traffic than a port can accommodate under congestion.

A scheduling system can be improved using a real-time measure, referred to herein as portload. It can be initialized to 0 when no traffic is flowing or to some other value. The initial condition of many packet routing and scheduling systems is that there is no packet in any queue. In the present description, portload is a measure of the congestion of the port, so it is initialized to zero.

After initialization portload can be defined by:

$$\text{portload} = \Sum_{i=1\text{-}N} \text{Sbw}_i * \text{Act}_i \qquad \text{Eq. (1)}$$

Equation 1 Assumes N channels are configured on a port and each has an allocated or shaped bandwidth allocation, $\text{Sbw}_i$, expressed as a percentage of the port rate. $\text{Act}_i$ is the $i^{th}$ channel activity indicator which is 0 when a channel queue is empty, otherwise it is 1.

To perform the above calculation in real-time, logic can be added to the queue admission algorithm so that, when a packet arrives, if the queue was empty and now is no longer empty with the arrived packet, then the channel bandwidth $\text{Abw}_i$ is added to portload. On the other hand when a packet leaves, if the queue then becomes empty, then the channel bandwidth $\text{Abw}_i$ is subtracted from portload.

The measurement portload as used herein reflects the real-time load level on the port. Whenever it is greater than 1, the scheduler will be in a condition of trying to squeeze more traffic through the port than the port can support. This approach takes advantage of the fact that the traffic in IP-based networks is mostly bursty. Packets tend to come in bursts that keep the respective queue non-empty for a while. Given this bursty traffic nature, it is not necessary to compute and change the portload for every packet. Computing scaling and load factors for every packet introduces a big computation burden to the system.

For example, if there are 8 channels each of 25% port bandwidth, when all 8 channels have a packet in their queues waiting to be sent, the port load level will be 200% or 2. If the port is loaded at 200%, then, to prevent congestion, the scheduler is adjusted to scale-back the channel traffic rate by a factor of 2, the portload value.

Some schedulers use a Modified Deficit Round Robin (MDRR) approach to scheduling. An instant traffic load algorithm can be applied as a load result to a MDRR scheduler and shaper to improve the congestion behavior of such a scheduler. In some systems with a MDRR-based scheduler, credits are added or subtracted from queues upon each round robin event. The credits can be modified using the portload value as follows:

When adding credits to a queue:
If portload>1, add quantum/portload, else add quantum.
When shaping the traffic going out:
If portload>1, use transmit_rate/portload, else use transmit_rate.

The quantum is the original credits added to the queue periodically. The transmit_rate is the original channel shaping rate.

This use of portload only scales down the shaper rate instantly, it does not break any original service contract associated with the original shaper. Compared to other more advanced techniques, this change to an MDRR technique should have a small implementation cost. The added operations can be accomplished with only two added computations. 1) When a packet arrives at a queue or leaves from a queue, global portload is updated only if the queue emptiness changes. 2) When scheduling a packet, multiply the credit or rate by portload only if portload>1.

FIG. 1 shows an embodiment of a simplified scheduler configuration to which scheduling has been added using the portload value discussed above. FIG. 1 has a set of incoming channels 10. The channels may be associated with different users, different enterprises, different sessions, or different communication demands from any user. In one embodiment, each channel corresponds to a Permanent Virtual Circuit. Each channel is coupled to a queue 11 in which packets from the channel are buffered until they can be routed through the port 13. Each queue is coupled to a scheduler 12 between each respective queue and the port. The scheduler scales the traffic based on the capacity of the port and any other desired factors, including the speed that has been allocated to the particular channel, the Quality of Service (QoS) for each channel, the type of packet in the queue and other factors.

A scoreboard 13 is coupled between the schedulers 12 and the port 14. The scoreboard is used as an Asynchronous Transfer Mode (ATM) packet scheduler. If the packets are not ATM packets, then a scoreboard may still be used in the system or another alternative may be used. A scoreboard scheduling mechanism may be used for any fixed-sized packet communications system and is not specific to ATM. Scoreboards are particularly useful when a position or slot on the scoreboard can be mapped to a fixed egress time interval for the port. For fixed-size packets, if data is sent for that entire time interval and then the port can be fully utilized.

The activity in each queue 11 is monitored by a scaler 15 which is coupled to each scheduler 12 to scale the scheduling of the traffic based on the activity in the queues. In this diagram, the scaler holds the port load. The lines into and out of the scaler show the computation and propagation paths.

Figure 2:
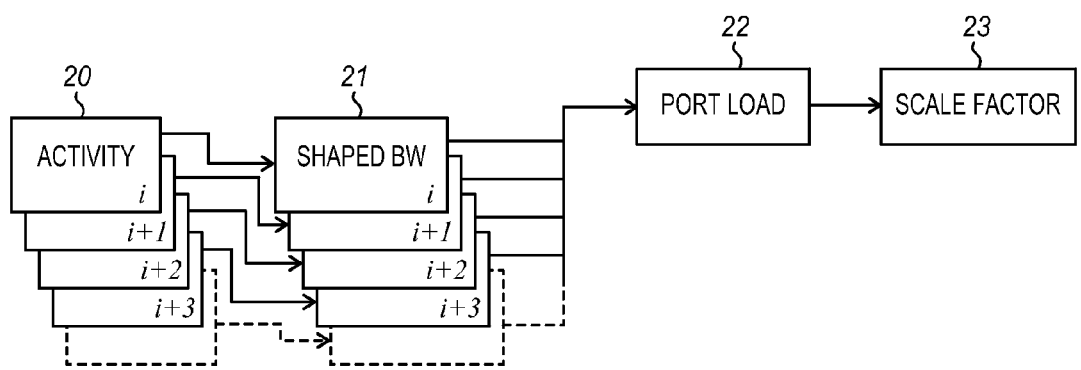
FIG. 2 is a simplified block diagram of logic to determine a scale factor according to one embodiment of the invention.

FIG. 2 is a diagram of a portion of the scaler of FIG. 1 in more detail. The diagram of FIG. 2 represents the operation of Equation 1 above. A plurality of activity monitors 20 are coupled to a corresponding shaped bandwidth ($BW_i$) register 21. In this embodiment, there is one activity monitor for each queue. The activity monitors 20 determine when a queue has changed from being empty to not being empty and when the queue has changed from being not empty to being empty. In the first case, empty to not empty, the activity monitor associated with the queue generates a positive one value. In the second case, not empty to empty, the activity monitor generates a negative one value.

The generated value is applied to the corresponding shaped bandwidth register 21. In the illustrated embodiment, there is one shaped bandwidth register for each activity monitor and, correspondingly, for each queue. Each shaped bandwidth register stores the bandwidth allocation (e.g. 25%) for the channel corresponding to the queue. When the generated value is applied to the bandwidth register, it is combined with the bandwidth register and the result is applied to a portload register 22. This causes the portload to be increased or decreased by the amount of the corresponding shaped bandwidth factor. The modified portload value is then applied to write over a scale factor register 23. Additional operations may be performed to modify or adapt the scale factor for a particular adaptation.

In the embodiment of FIG. 1, the scale factor from the scale factor register 22 of the scaler 15 is applied to the schedulers for each channel. This slows the application of packets to the scoreboard and reduces or eliminates the congestion on the port 14.

In this embodiment, an instant traffic load approach is used for ATM packets. The global variable portload, as previously described, is used to track the port traffic load level. While many of the examples herein are applied to ATM technologies, the techniques may also be applied to other scheduling systems. An ATM packet may be referred to as a cell and the term cell may be used to refer to other types of packets, especially fixed-rate packets and to fixed size portions of variable-size packets.

In some ATM processors cells are scheduled using an Inter-Cell-Interval (ICI). The ICI can be used to indicate an interval between cells on the scoreboard. In other words, when placing a new cell on the scoreboard, ICI indicates how many scoreboard slots the new cell should be away from the next closest cell. The spacing of the cells then controls the timing with which the cells are fed to the port. In this embodiment, rather than scaling credits, portload can be used to scale the ICI.

The following logic shows an embodiment of logic that can be added to a scheduler/shaper that uses ICI on a scoreboard. When a cell is removed from the scoreboard (this corresponds to being sent out to the port):

If portload>1, place the next cell using Modified_ICI, else use ICI.
Modified_ICI=ICI*portload In this embodiment the shaped bandwidth can be the $Sbw_i$, discussed above, or some other value. In one embodiment, an average bandwidth can be used. This value, as used herein, corresponds to the allocated or shaped percentage bandwidth which is known at configuration time. Other measures can be used, depending on the desires and needs of users, customers, and service providers.

Figure 3:
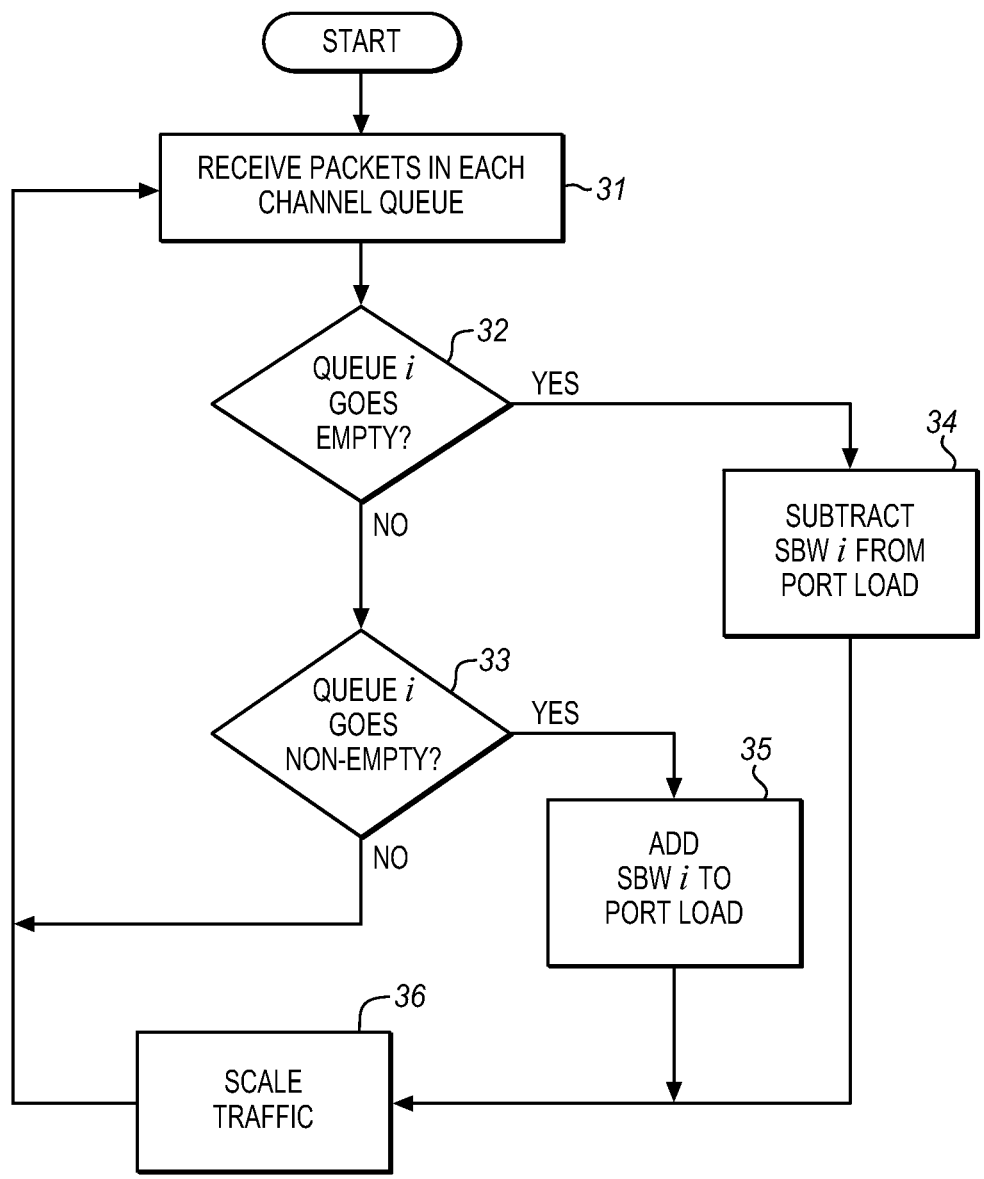
FIG. 3 is a process flow diagram of determining a scale factor according to one embodiment of the invention.

FIG. 3 is a process flow diagram for the processes described above. In FIG. 3, at 31 packets are received into one or more packet queues for transmission through a port. While the description is presented in the context of packets, data can come in any of a variety of other forms and the techniques herein apply to any form of data that can be buffered in queues and scheduled. At 32 activity monitors determine whether a queue goes empty from having some buffered data. At 33, activity monitors determine whether a queue goes non-empty from being empty. If a queue goes empty, then, at 34, some factor, in this embodiment, a shaped bandwidth factor is subtracted from the portload value. If a queue goes non-empty, then, at 35, a shaped bandwidth is added to the portload value. At 36, the portload value is used to scale the traffic.

Similar techniques can also be applied to scheduling traffic with two priorities. A variety of different designs can be achieved including a rate scaling hierarchy of high priority and low priority rates. A rate scaling hierarchy can be established using the system shown in FIG. 4. Here the unused bandwidth from a higher priority propagates down to the lower priority. The scaler scales the aggregate channel bandwidth up to the unused low priority bandwidth, while maintaining a strict prioritization between the two priorities. The use of the portload global variable approach inherently applies time-delayed averaging which helps to ensure stability.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

By using two global traffic load variables, one for each priority, a two-priority scheduling effect is obtained indirectly. More global traffic variables can be used to expand the technique to schedule more priorities. The global traffic variables described herein are simpler to implement than priority scheduling typically implemented in schedulers in which the packets or queues are directly evaluated to pick which channel to send.

Figure 4:
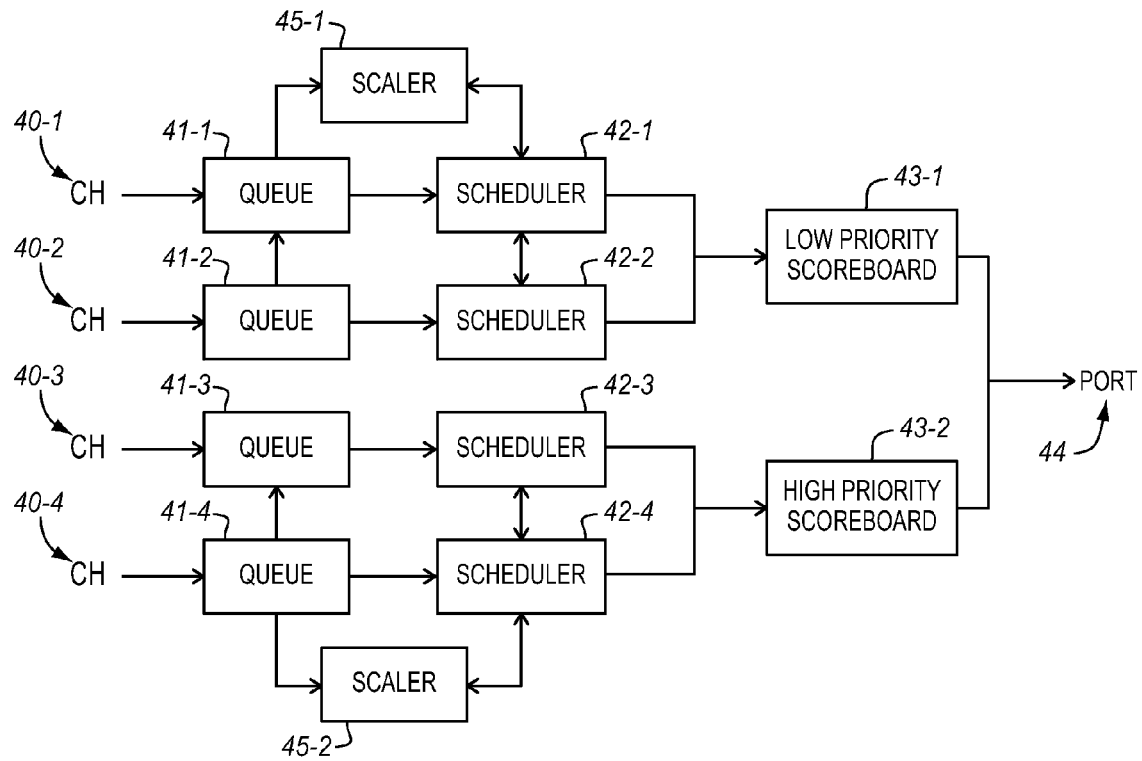
FIG. 4 is a simplified block diagram of a packet scheduler according to a second embodiment of the invention.

In the embodiment of FIG. 4, there are two variables portload_high and portload_low used in the scheduling system. They can be initialized to 0 when no traffic is flowing. As in FIG. 1, each channel's allocated bandwidth is represented as a percentage of port bandwidth. The queue emptiness is tracked and the queue knows to which priority it belongs. FIG. 1, has multiple incoming channels 40-1, to 40-4, each coupled to a respective queue 41-1 to 41-4, each coupled to a respective scheduler 42-1 to 42-4.

The first two schedulers 42-1 and 42-2 are coupled to a low priority scoreboard 42-1. The second two schedulers 42-3 and 42-4 are coupled to a high priority scoreboard 43-2. The scoreboards feed packets, in this case called cells, to the port 44, the egress from the system. The first two schedulers correspond to low priority queues and the second two schedulers correspond to high priority queues. Many more queues can be coupled to each of the scoreboards. The embodiments of the present description are presented with only four channels in order to simplify the drawings and ease understanding.

The schedulers are controlled by scalers. The high priority schedulers are controlled by a high priority scaler 45-1 that uses the portload_high variable. The low priority schedulers are controlled by a low priority scaler 45-2 that uses the portload_low variable. The two global traffic variables portload_high and portload_low can be adapted and modified to suit different types of scalers, depending on the particular implementation. Scale factors can be applied directly, to credits, to ICI factors or in other ways, depending on the scheduler.

In one embodiment of the invention, the scoreboards are controlled using two modifications of the ICI. Modified ICI high is the ICI scaled by the high portload factor. Modified ICI low is the ICI scaled by the sum of the high and low portload factors. In the initial conditions of the system, there are no packets in any queue. Therefore portload_high=0 and portload_low=0. These values are modified with the logic as follows:

When a packet arrives AND the high priority queue is empty:
add the channel bandwidth $Sbw_i$ to portload_high.
When a packet leaves AND the high priority queue becomes empty:
subtract the channel bandwidth $Sbw_i$ from portload_high.
When a packet arrives AND the low priority queue is empty:
add the channel bandwidth $Sbw_i$ to portload_low.
When a packet leaves AND the low priority queue becomes empty:
subtract the channel bandwidth $Sbw_i$ from portload_low.
When a cell is removed from the high priority scoreboard (because it is sent out to the port 44):
If portload_high>1, place the next cell using Modified_ICI_high, else use ICI.
When a cell is removed from the low priority scoreboard:
If portload_high+portload_low>1, place the next cell using Modified_ICI_low, else use ICI.
As mentioned above, $$\text{Modified\_ICI\_high}=\text{ICI}*(\text{portload\_high})$$

$$\text{Modified\_ICI\_low}=\text{ICI}*(\text{portload\_high}+\text{portload\_low})$$

The high priority scaler portload_high can be derived as shown in FIG. 3 relying only on the high priority queues. The low priority port load scaler (portload_high+portload_low) can be derived in one of at least two different approaches:

In a first approach, whenever portload_high is changed due to a high priority queue becoming empty or non-empty, add or subtract the same amount to or from portload_low as is added to or subtracted from portload_high. This causes portload_low=portload_high+portload_low.

In a second approach, run a background process and use a separate variable portload_low_actual. The background process periodically sets portload_low_actual=portload_high+portload_low. Then use Modified_ICI=ICI*portload_low_actual in substitution for Modified_ICI=ICI*(portload_high+portload_low). This approach introduces a bit lag that may cause momentary port congestion but it should stabilize quickly as the background process runs. Either of these approaches, and others, can be performed in software. With the help of dedicated or purpose-built hardware, the software burden can be eased.

Figure 5:
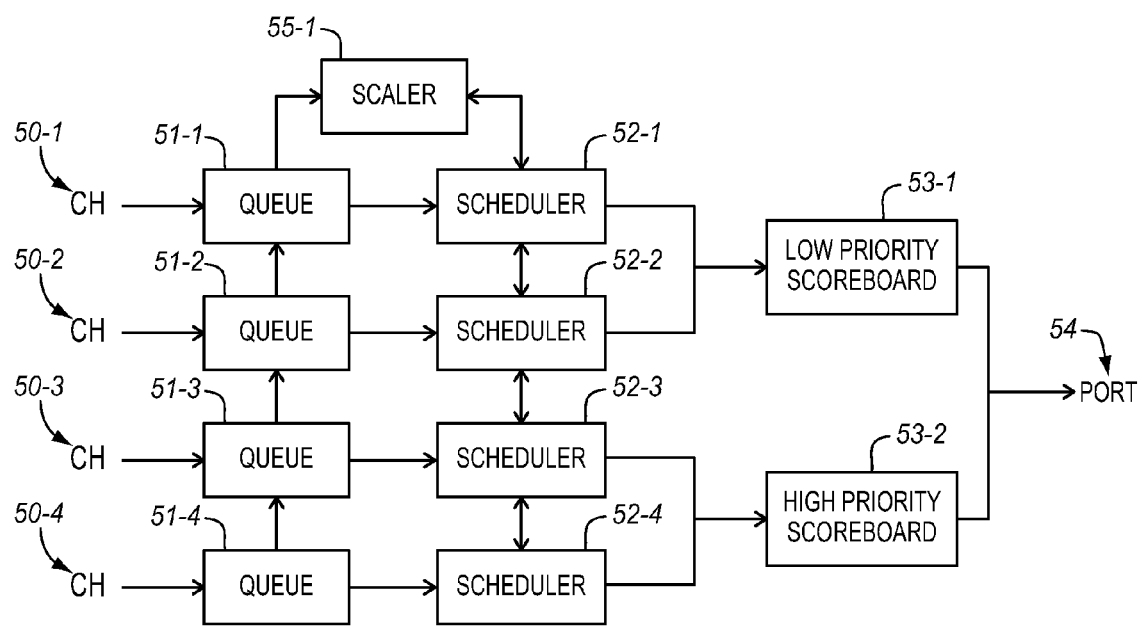
FIG. 5 is a simplified block diagram of a packet scheduler according to a third embodiment of the invention.

FIG. 5 shows another alternative scheduler using a further variation on the techniques described above. In FIG. 5, there are multiple, in this embodiment four, incoming channels 50-1, to 50-4, each coupled to a respective queue 51-1 to 51-4, each coupled to a respective scheduler 52-1 to 52-4.

The first two schedulers 52-1 and 52-2 are coupled to a low priority scoreboard 52-1. The second two schedulers 52-3 and 52-4 are coupled to a high priority scoreboard 53-2. The scoreboards feed packets to the port 54. The first two schedulers correspond to low priority queues and the second two schedulers correspond to high priority queues. Many more queues can be coupled to each of the scoreboards. In contrast to the embodiment of FIG. 4, there is only one scaler 55 coupled to all of the schedulers. Again, FIG. 5 shows scoreboards as an ATM scheduler. The scoreboards can be applied to other packets, especially to fixed size packets or fixed size portions of variable size packets. Accordingly, the structure of the scheduling applies to other scheduling and shaping systems too. The structure may also be modified to operate without the scoreboard.

In addition, while FIGS. 4 and 5 show two scoreboards for priority scheduling, since the described techniques already cover the priorities in the scaling factor calculations, a single scoreboard may alternatively be used.

The embodiment of FIG. 5 allows a single group as represented by the single scaler and the connected queues to maintain multiple priorities. The one scaler controls the aggregate traffic on all of its priorities. This can be used in conjunction with the priority-based hierarchy of FIG. 4 to form more complex bandwidth sharing systems. Priority scheduling results can be achieved without the scheduler priority mechanism of FIG. 4.

Figure 6:
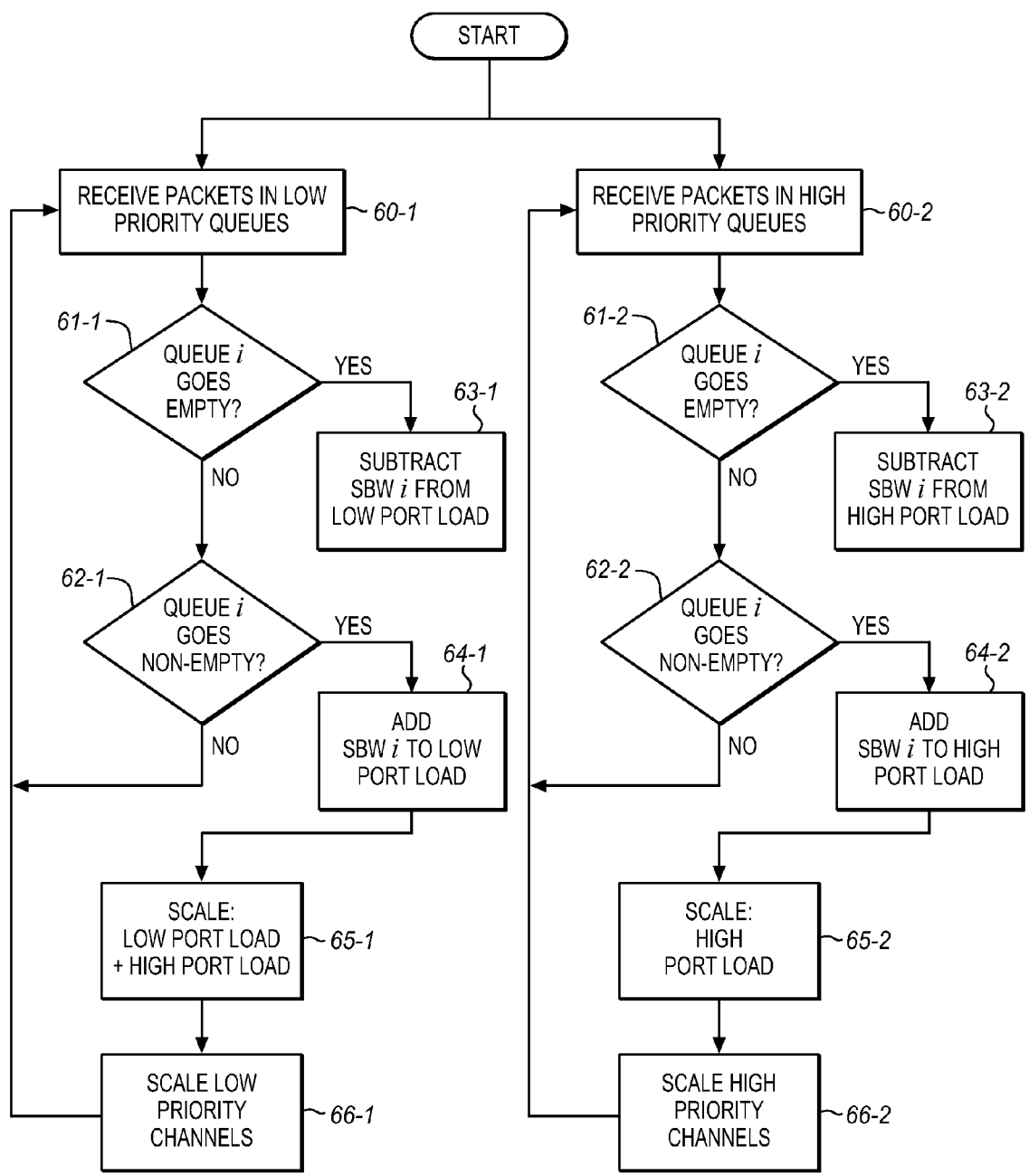
FIG. 6 is a process flow diagram of determining multiple scale factors according to the third embodiment of the invention.

FIG. 6 is a process flow diagram to show how rate scaling can be achieved with multiple priorities using two portload values, portload_low and portload_high. The flow diagram shows specifically a process as implemented in FIG. 4. At 60-1 packets are received into one or more packet queues for transmission through a port. As in all of the described embodiments, data can come in any of a variety of other forms and the techniques herein apply to any form of data that can be buffered in queues and scheduled. At 61-1 activity monitors determine whether a queue goes empty from having some buffered data. At 62-1, activity monitors determine whether a queue goes non-empty from being empty. These queues may be all of the queues or just the low priority queues.

If a queue goes empty, then, at 63-1, some factor, in this embodiment a shaped bandwidth factor, is subtracted from the low portload value. If a queue goes non-empty, then, at 64-1, a shaped bandwidth is added to the low portload value. At 65-1 the scaling factor is calculated as the sum of the low portload value and the high portload value. At 66-1, the scaling factor is used to scale the low priority traffic. As mentioned previously, this may be done by scaling rates, credits, ICI values or any other traffic rate value depending on the particular scheduling system.

At about the same time, a parallel process is operating for the high priority queues. At 60-2 packets are received into the high priority packet queues for transmission through a port. At 61-2 activity monitors determine whether a queue goes empty from having some buffered data. At 62-2, activity monitors determine whether a queue goes non-empty from being empty. These queues may be all of the queues or just the high priority queues.

If a queue goes empty, then, at 63-2, a shaped bandwidth factor is subtracted from the high portload value. If a queue goes non-empty, then, at 64-2, a shaped bandwidth is added to the high portload value. At 65-2 the scaling factor is determined as the high portload value and at 66-2, the scaling factor is used to scale the high priority traffic.

For sophisticated scheduling, group effects can be taken into account. Again, while the following embodiment of the invention is presented in the context of ATM, it may be adapted to suit other kinds of traffic. First, restrict a group of channels selected from any of various groups to use a total of less than 30% of port bandwidth. All of the channel groups will be scaled back proportionally regardless of their priority. However, a channel in the high priority group will be placed onto a high priority scoreboard. This gives it a better chance of being routed to the port with lower delay. Typically, the lower-priority scoreboards are scheduled later and packets on those scoreboards suffer more delay.

Globally, the portload variable is added to the scheduling system. Instead of zero, as in the previous embodiments, it is initialized to 70% when no traffic is flowing. Each channel's allocated bandwidth, $ABw_i$ is represented as a percentage of port bandwidth. The initial condition of the system is that there is no packet in any queue. portload=0.7. Therefore, when the aggregated load added by real channels exceeds 30%, the portload will exceed 1, and all channels will scale back.

The logic added to the queue is similar to that of the previously described embodiments. The queue emptiness is tracked.

When a packet arrives AND the queue is empty:
add the channel bandwidth to portload.
When a packet leaves AND the queue becomes empty:
subtract the channel bandwidth from portload.

The logic added to scheduler/shaper can be the same as before with one priority and this logic is used to obtain a hierarchical scheduling effect. Crossing-priority grouping of channels can be used to restrict bandwidth used by certain kinds of channels across all subscribers.

Hierarchical scheduling is often used to achieve complicated traffic management goals. In such a scenario, a port level scheduler takes traffic from a few subport schedulers. Each of the schedulers is individually configured. Traffic sharing goals can be implemented among groups of channels by applying different parameters at different schedulers.

Some advantages of hierarchical scheduling are the intuitive simplicity, and compliance. The intuitive simplicity is that all the schedulers can be done in the same way. For compliance, all the schedulers can shape traffic to conform to the relevant traffic contracts. The traffic will be able to pass through various traffic policing points. As a compliance example, consider that carrier A provides tunneling service, and a customer is using the tunnel to connect to a carrier B. In this example, the connection to carrier A will be shaped by the port scheduler, and the connection inside the tunnel is shaped by a subport scheduler. When both the port scheduler and subport scheduler are configured properly, the traffic sent by the customer will be in compliance with both carrier As policer and carrier B's policer.

The intuitive simplicity, however, causes hardware complexity because a packet goes through multiple schedulers/shapers in its way to be sent out. This can be seen by considering an example of a single port scheduler, and two subport schedulers. The port will have e.g. a 100M bandwidth. Each subport group will be assigned e.g. 80M bandwidth. Traffic from the two subports may congest the port. Under congestion traffic is relieved if the two groups share bandwidth evenly.

To provide these benefits, in one embodiment, a new global variable portload_top is added. It is initialized to 0 when no traffic is flowing. In addition two new variables groupload_1 and groupload_2, are added, one for each group of channels. These three variables can be used for load tracking. portscale_1 and portscale_2 are added to track the load scaling feedback from the port to the groups, and groupscale_1 and groupscale_2 are added to apply the actual scale-back factors to channels in each group.

The logic added to the queues is the same as that presented above. As mentioned above, the initial condition of the system is that there is no packet in any queue and the queue emptiness is tracked. For the new variables, the following logic is used.

When a packet arrives AND the queue is empty:
add the channel bandwidth $Sbw_i$ to groupload_1 or groupload_2, respectively.

When a packet leaves AND the queue becomes empty:
subtract the channel bandwidth $Sbw_i$ from groupload_1 or groupload_2, respectively.

Additional logic up-propagates the loads from the groups to the port, using one of at least two alternatives:

When groupload_1 or groupload_2 changes:
update portload_top by direct computation of portload_top=groupload_1+groupload_2.

Or use a background process to do the computation.

The port load result is also down-propagated (using direct computation or a background process):
If portload_top>1:
set portscale_1=portload_top and portscale_2=portload_top, else, set portscale_1=1 and portscale_2=1.
If groupload_1/Abw_group_1>1:
set groupscale_1=(groupload_1/Abw_group_1)*portscale_1, else, set groupscale_1=portscale_1.
where Abw_group_i (i=1 or 2) is the % of group i traffic and both equal 0.8 in this embodiment. Notice that here the groupscale_1 and portscale_1 are always 1 or larger, thus in scheduler processes there is no assessment as to whether these values are less than 1.

The same scaling factor computation is done to groupscale_2 and portscale_2.

The traffic load scale factors groupscsale_1 and groupscale_2 are then applied to the schedulers.

The logic added to the scheduler/shaper is similar to the embodiments described above, except that the channel is scaled back by a factor of groupscale_1 or groupscale_2 respectively. There is also no need to check if groupscale_1>1 or not.

This embodiment of the invention allows a hierarchical scheduling effect to be achieved using the traffic load technique with a port load value. This technique uses less resources than direct hierarchical scheduling. As a result, hierarchical scheduling can be used for forming bandwidth-sharing groups. This can replace the need for policing traffic compliance at higher-level schedulers because as the channel schedules are scaled back, the channel traffic is always in compliance.

Figure 7:
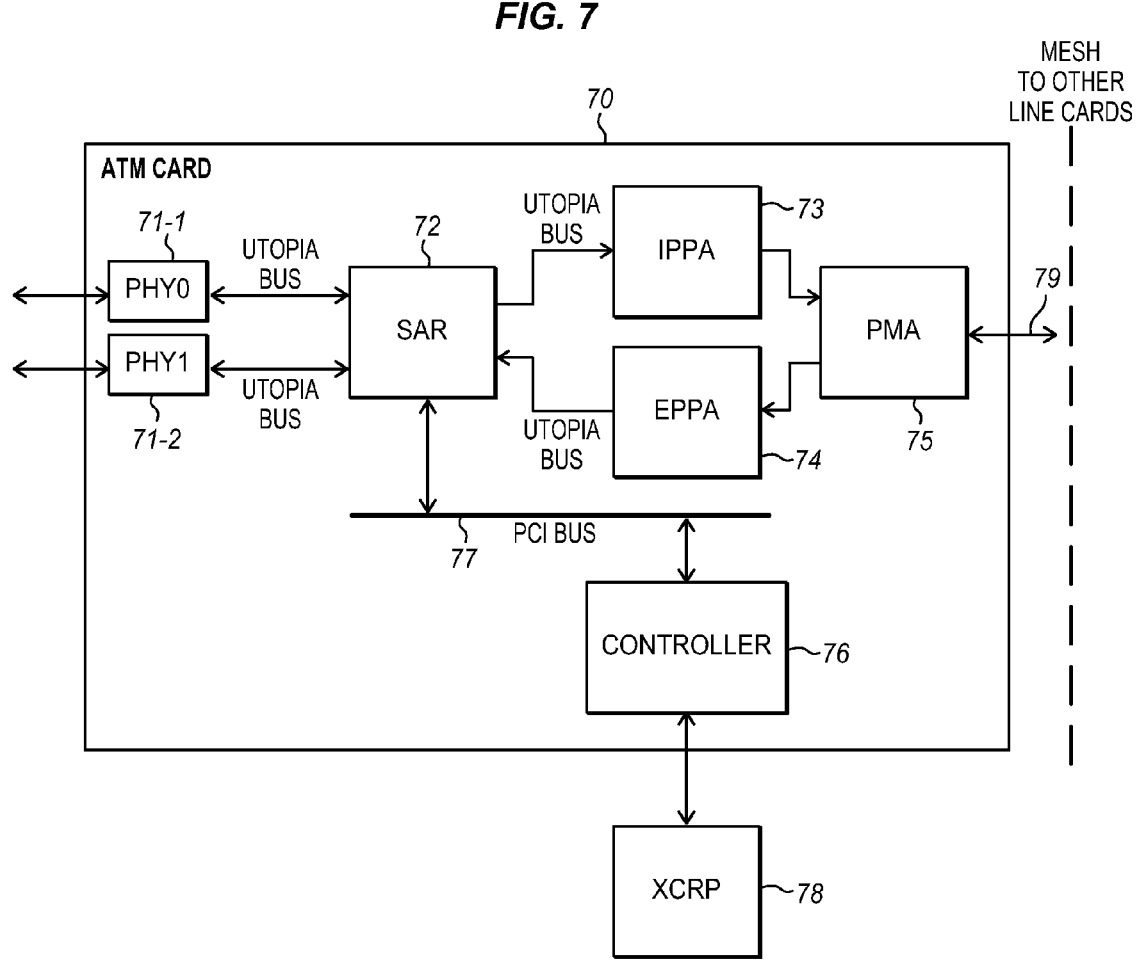
FIG. 7 is a block diagram of a line card suitable for implementing any one or more of the schedulers of the described embodiments of the invention.

FIG. 7 shows an example of a line card 70 suitable for implementing the scheduling and scaling of any one or more of the embodiments of the invention discussed above. The line card of FIG. 7 includes two physical layer interfaces 71-1, 71-2, in the form of front end line interface chips, labeled PHY0, and PHY1. The PHY chips provide an interface for the channels and the port described above. The PHY chips are coupled through, e.g. a Universal Test & Operations Physical Interface for ATM (UTOPIA) bus that provides a level 1 data path interface between the Physical Layer (PHY) and the upper layers in ATM to an ATM Segmentation And Reassembly (SAR) device 72. The SAR is coupled through another UTOPIA bus to packet processor such as an Ingress Packet Processing ASIC (Application Specific Integrated Circuit) (IPPA) 73 to buffer, schedule and scale incoming packets and also to a packet processor such as an Egress Packet Processing ASIC (EPPA) 74 to buffer and schedule outgoing traffic through the port.

The IPPA and EPPA are coupled to the mesh or backplane to other line cards through a fabric interface such as a Packet Mesh ASIC 75. The SAR 72, on the other hand is coupled through a Peripheral Component Interconnect (PCI) bus to a control and configuration processor 76. This processor is coupled through a control interface to an external processor such as an external cross connect route processor 78 on the chassis.

The architecture shown in FIG. 7 is particularly suitable for ATM and embodiments of the invention may be applied to other types of system architectures and other protocols. In the embodiment of FIG. 7, packets can be routed through the PHY interfaces 71 or through the PMA 75 to other line cards and then through PHY interfaces of other line cards. The PHY interfaces may be different on different line cards including Ethernet. The port referred to above may be on the PHY interfaces or on the fabric or backplane interface. The logic operations described above may be performed in the IPPA, the EPPA, and the processor and controlled locally in the local processor or by the remote processor, depending on the particular implementation.

Figure 8:
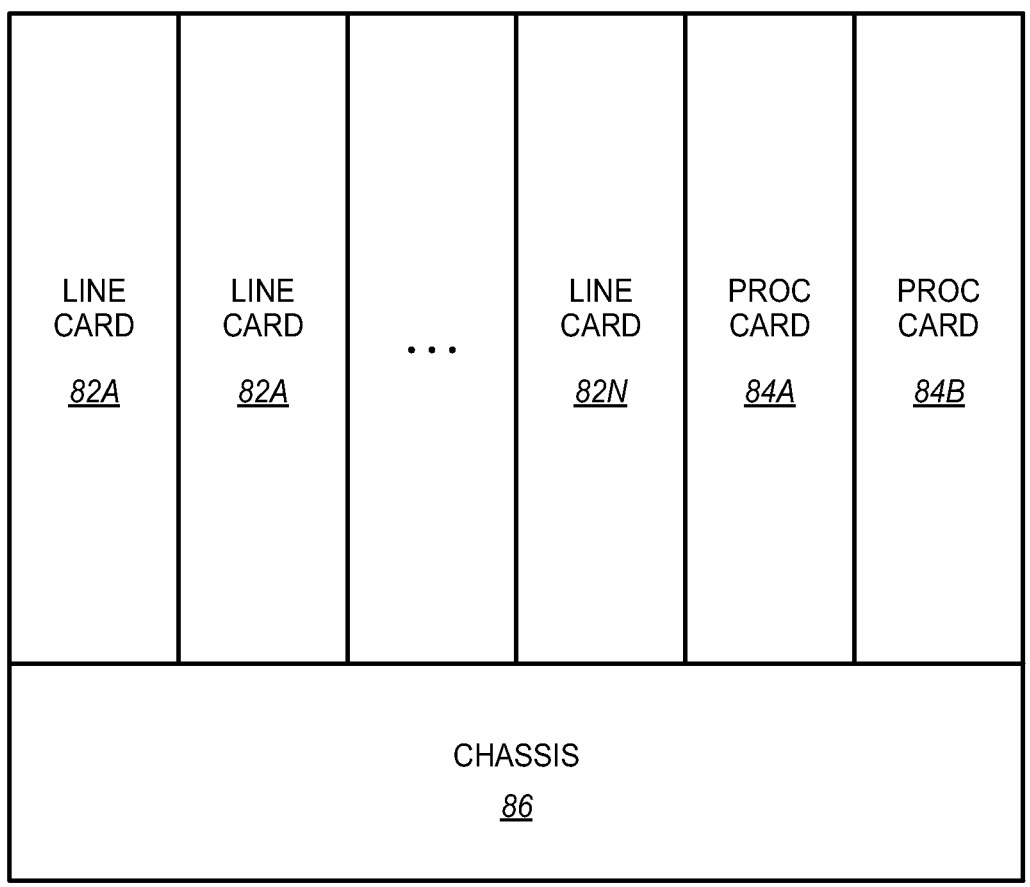
FIG. 8 is a block diagram of a network element capable of carrying the line card of FIG. 7 according to an embodiment of the invention.

FIG. 8 is a block diagram illustrating a network element 80 capable of carrying the line card of FIG. 7 together with other line cards and the mesh to interconnect them. The ATM card of FIG. 7 is represented as a line card in FIG. 8. In one embodiment of the invention a chassis 86 is coupled to a group of N line cards 82A-N and processing cards 84A-B. Additional and other types of devices (not shown) may be coupled to the chassis 86. Traffic shaping algorithms may be a part of the line cards 82A-N and/or the processing cards 84A-B, alternate embodiments may have alternate card arrangements (a combined line and processing cards with one or more ports and a forwarding engine, one processing card per line card, multiple processing cards per line card, etc.). The network element 80 includes line cards 82A-N to forward packets.

This implementation of the traffic shaping module is shown as an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The traffic shaping module cards in the form of line cards 82A-N, and processor cards 84A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a non-transitory machine-readable storage medium includes read only memory (ROM); random access memory (RAM); magnetic disk storage media; optical storage media; flash memory devices); while a transitory machine-readable communication medium include electrical, optical, acoustical or other form of propagated signals (e.g., carrier waves, infrared signals, digital signals, etc.)

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element to scale packet traffic rates of packets in-transit from channels to a port, the packets being from a plurality of channels for transmission from the network element through the same port of the network element, the method comprising the steps of:
   receiving packets through each of the plurality of channels and storing the received packets in a respective queue for each channel;
   monitoring a status of each queue as empty or not empty;
   in response to determining the status of a queue has changed from empty to not empty, adding a bandwidth allocation for the respective channel to a port load value;
   in response to determining the status of the queue has changed from not empty to empty, subtracting the bandwidth allocation for the respective channel from the port load value; and
   scaling the traffic rates of the channels to the port based upon the port load value.

2. The method of claim 1, wherein scaling the traffic rate comprises changing the scaling upon adding and upon subtracting from the port load value.

3. The method of claim 1, wherein the bandwidth allocation for each channel corresponds to a percentage of the maximum port traffic rate that the respective channel is allowed to use.

4. The method of claim 3, wherein scaling the traffic rate comprises reducing the traffic rates of the channels to the port upon the port load value being greater than the maximum port traffic rate.

5. The method of claim 3, wherein scaling the traffic rate comprises scaling the traffic rate only if the port load value is greater than 100 percent.

6. The method of claim 1, wherein scaling the traffic rate comprises adding credits to a record corresponding to a queue, wherein a scheduler shapes traffic for each queue through the port based on the credits for the respective queue.

7. The method of claim 6, wherein adding credits comprises scaling an inter-cell-interval by the port load value.

8. The method of claim 1, further comprising assigning a first portion of the plurality of channels to a first low priority group, and assigning a second portion of the plurality of channels to a second high priority group, and wherein adding and subtracting a bandwidth allocation comprise adding and subtracting a bandwidth allocation from a first low port load value if the respective queue corresponds to a channel in the first portion and from a second high port load value if the respective queue corresponds to a channel in the second portion.

9. The method of claim 8, wherein scaling the traffic rate comprises scaling the traffic rate only if the sum of the low port load value and the high port load value exceeds 100 percent.

10. The method of claim 8, wherein adding and subtracting further comprises adding and subtracting a bandwidth allocation from the first low port load value also if the respective queue corresponds to a channel in the second portion.

11. The method of claim 8, wherein scaling the traffic comprises scaling the high priority traffic based on the high port load value and scaling the low priority traffic based on a sum of the high port load value and the low port load value.

12. A network element for use in sending packets received from a plurality of channels through a port, the network element comprising:
   a plurality of channel interfaces to receive packets;
   a plurality of packet queues coupled respectively to each channel interface to buffer packets received at the channel interfaces;
   a port coupled to the queues to transmit received packets from the queues; and
   a scaler to monitor the status of each queue as empty or not empty, to add, in response to determining the status of a queue has changed from empty to not empty, a bandwidth allocation for a respective channel to a port load value, to subtract, in response to determining the status of the queue has changed from not empty to empty, a bandwidth allocation for the respective channel to the port load value, and to scale the traffic rates of the channels to the port based upon the port load value.

13. The network element of claim 12, wherein the scaler changes the scaling upon adding and upon subtracting from the port load value.

14. The network element of claim 12, wherein the bandwidth allocation for each channel corresponds to a percentage of the maximum port traffic rate that the respective channel is allowed to use.

15. The network element of claim 12, wherein the bandwidth allocation for each channel corresponds to an average bandwidth provided in a traffic contract.

16. The network element of claim 12, wherein a first portion of the plurality of channels are assigned to a first low priority group, and a second portion of the plurality of channels are assigned to a second high priority group, and wherein the scaler comprises a first low priority scaler to add and subtract a bandwidth allocation from a first low port load value if the respective queue corresponds to a channel in the first portion and a second high priority scaler to add and subtract a bandwidth allocation from a second high port load value if the respective queue corresponds to a channel in the second portion.

17. The network element of claim 16, wherein the first scaler scales the low priority traffic only if the sum of the low port load value and the high port load value exceeds 100 percent.

* * * * *

UNITED STATES PATENT AND TRADEMARK OFFICE
CERTIFICATE OF CORRECTION

| | | |
|---|---|---|
| PATENT NO. | : 8,681,616 B2 | Page 1 of 1 |
| APPLICATION NO. | : 13/209319 | |
| DATED | : March 25, 2014 | |
| INVENTOR(S) | : Chen et al. | |

It is certified that error appears in the above-identified patent and that said Letters Patent is hereby corrected as shown below:

In the Specification

In Column 5, Line 53, delete "port 13." and insert -- port 14. --, therefor.

In Column 6, Lines 34-35, delete "scale factor register 22" and insert -- scale factor register 23 --, therefor.

In Column 7, Lines 56-57, delete "low priority scoreboard 42-1." and insert -- low priority scoreboard 43-1. --, therefor.

In Column 8, Lines 66-67, delete "low priority scoreboard 52-1." and insert -- low priority scoreboard 53-1. --, therefor.

In Column 10, Line 48, delete "As" and insert -- A's --, therefor.

In Column 10, Line 63, delete "tracking." and insert -- tracking, --, therefor.

In Column 12, Line 64, delete "devices);" and insert -- devices; --, therefor.

In Column 13, Line 3, delete "(ASIC s)" and insert -- (ASICs) --, therefor.

Signed and Sealed this
Fifteenth Day of July, 2014

Michelle K. Lee
*Deputy Director of the United States Patent and Trademark Office*